July 14, 1953 — T. F. E. FUCHSLOCHER — 2,645,132
REINFORCED POWER TRANSMISSION BELT
Filed Nov. 27, 1948
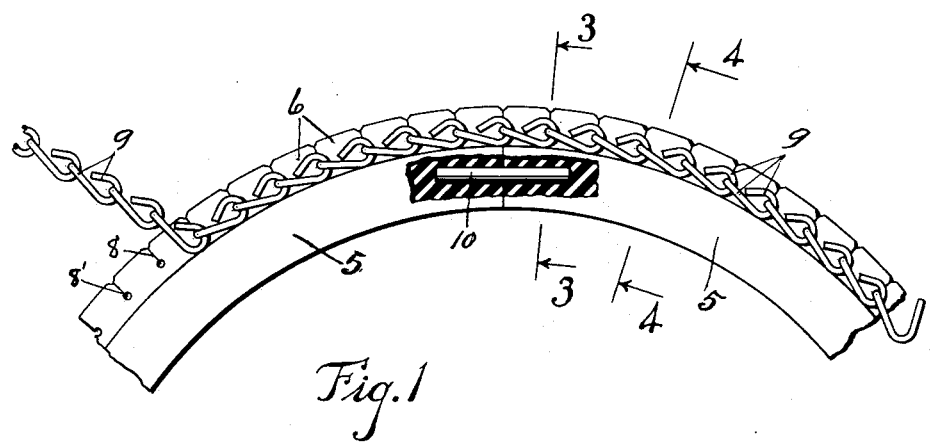
Fig.1
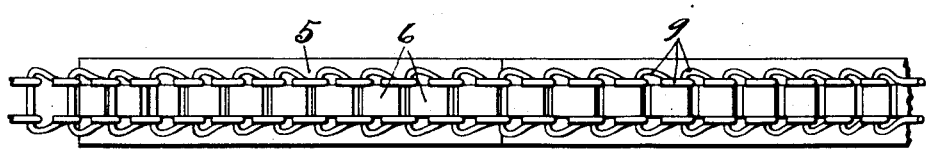
Fig.2
Fig.3
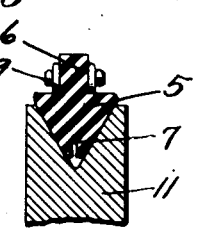
Fig.4
INVENTOR.
Theodor F. E. Fuchslocher
BY
ATTORNEY.

Patented July 14, 1953

2,645,132

UNITED STATES PATENT OFFICE 2,645,132

REINFORCED POWER TRANSMISSION BELT

Theodor F. E. Fuchslocher, Van Nuys, Calif.

Application November 27, 1948, Serial No. 62,332

8 Claims. (Cl. 74—234)

This invention relates to reinforced power transmission belt, and more particularly to that type of transmission belt which is composed of a belt body made of rubber, leather or other suitable flexible material, with a reinforcing chain structure embodied as a part thereof and giving strength thereto without interfering with its flexibility and applicability to large and small pulleys or wheels, and particularly pulleys of the type adapted for use with V-belts.

Among the salient objects of the invention are: to provide a flexible belt body of the V-shape in cross section, with a straight top portion of reduced width, and on the opposite sides of which, and through which the links of a chain can be compactly fitted; to provide in a V-shaped belt a V-shaped groove around its inner edge and which can be compressed as it runs into the V-shaped groove of the pulley or wheel on which it operates.

Other advantages and objects will appear from the following more detailed description of one practical embodiment of the invention, taken with the accompanying sheet of drawings, in which:

Figure 1 is a side elevation of a section of a reinforced power transmission belt embodying my invention, with a part broken out and shown in section, to show one form of joint between two meeting ends of such a belt;

Figure 2 is a plan view of such a belt;

Figure 3 is a cross sectional view through the belt body showing the V-groove in the belt body; and Figure 4 is a cross sectional view through the belt and a V-pulley, to show how the V-groove in the belt compresses in the V-groove of the pulley.

Referring now in detail to the drawings, the belt body is designated 5, with its top ridge or extension 6, and the V-groove 7. The top, narrow extension is slitted, as at 8, at intervals corresponding to the links of a chain, here designated 9, 9, the inner ends of the slits 8 terminating in transversely extending holes 8', corresponding to the size of the wire of which the chain is made.

As the chain, made up of the links 9, 9, is applied to the belt body, the sides of the links fit in the angle formed between the belt body 5 and the top extension 6, as clearly indicated, the connecting bar of each link is pressed through the slit 8, and into the hole 8' as also clearly indicated and as will be understood from Fig. 1, in which a few of the links are shown out of engagement with the belt body.

Two ends of the belt body are shown brought together in Fig. 1, in section, and are connected by a short rod 10 inserted into the adjacent ends of the belt body and so as to bridge the joint between the two ends of the belt body, as clearly shown in said Fig. 1.

Thus I have provided a reinforced power transmission belt which is flexible and which is strong, and which is compact and free of lateral projections by reason of the cross sectional formation of the belt body with the angles at opposite sides to receive the opposite sides of the chain, with the slits 8 and holes 8' to receive snugly the cross bars of the links, as clearly illustrated.

The V-groove in the inner side of the belt body enables the V-part of the belt to fit more snugly into the V-groove of the pulley or wheel, here designated 11.

I do not limit the invention to the details of construction here shown for explanatory purposes, except as I may be limited by a fair construction of the claims hereto appended and forming a part of this specification.

I claim:

1. A reinforced power transmission belt consisting of a belt body of flexible material, in V-shape in cross section with a central top ridge along its top to form angle spaces at opposite sides thereof, a chain having its opposite sides along said angle spaces with its cross bars through said top ridge portion.

2. A reinforced power transmission belt consisting of a belt body of flexible material, in V-shape in cross section with a central top ridge-like portion along its top side, said portion having radial slits therein to receive the cross bars of links of a chain, and a chain having its side portions on opposite sides of said top ridge-like portion and having the connecting bars of the links of said chain pressed into said slits.

3. A reinforced power transmission belt consisting of a belt body of flexible material in V-shape in cross section with a ridge portion along its top and forming angle spaces between said body and said ridge portion, said ridge portion having radial slits spaced along its length, each slit terminating in a transverse hole through said ridge portion, a chain having connected links along the opposite sides of said ridge portion, upon the top of the body of said belt, with the connecting bars between the sides of said chain inserted through said slits and into the holes in said ridge portion.

4. A reinforced power transmission belt consisting of a belt body of flexible material, V- shape in cross section, with a ridge portion along its top, and a V-groove along its inner side making it compressible in a V-grooved pulley, and a reinforcing chain along its top, at opposite sides of said ridge portion, with the cross bars of said chain extending through said ridge portion from one side to the other side thereof.

5. A reinforced power transmission belt of the character referred to including a belt body of flexible material having a ridge portion along its top and narrower than the body proper to form angle spaces along the opposite sides of said ridge portion, and a chain having its side link portions at opposite sides of said ridge portion, said side link portions being connected by bar portions extended through said ridge portion of said belt body.

6. A reinforced transmission belt including a belt body of flexible material having a ridge portion along its top of narrower width to form angle spaces along the body at opposite sides of said ridge portion, said ridge portion having radial slits therein, a reinforcing chain having its side link portions along the opposite sides of said ridge portion, with cross bar connecting parts of said links in said slits through said ridge portion.

7. A reinforced transmission belt including a flexible belt body having a ridge portion of narrower width along its top and forming angle spaces along the body at opposite sides of said ridge portion, said ridge portion having spaced slits to the body portion proper and terminating in holes through said ridge portion, the two ends of said belt body abutting each other with a connecting rod inserted into the ends to bridge the joint therebetween, and a reinforcing chain along opposite sides of said ridge portion with connecting parts through said ridge portion in said holes.

8. A reinforced power transmission belt of flexible material of V-shape in cross section and having an integral ridge portion along its top side, and forming angle spaces at opposite sides of said ridge portion, said ridge portion having transverse slits therein to the body proper, said body having a V-groove in and along its inner narrow edge, to be compressible in a V-groove of a pulley, and a reinforcing chain straddling said ridge portion and having connecting parts thereof in said slits at intervals along said ridge portion.

THEODOR F. E. FUCHSLOCHER.

References Cited in the file of this patent

UNITED STATES PATENTS

| Number | Name | Date |
|---|---|---|
| 508,153 | Storie | Nov. 7, 1893 |
| 984,099 | Manoog | Feb. 14, 1911 |
| 1,224,230 | Stricker | May 1, 1917 |
| 1,407,598 | Smith et al. | Feb. 21, 1922 |
| 2,404,271 | Brunner | July 16, 1946 |
| 2,555,190 | Fuchslocher | May 29, 1951 |

FOREIGN PATENTS

| Number | Country | Date |
|---|---|---|
| 113,793 | Sweden | Apr. 10, 1945 |